United States Patent
Lu

(10) Patent No.: US 7,903,438 B2
(45) Date of Patent: Mar. 8, 2011

(54) DC-AC CONVERTER WITH FAST RESPONSE SPEED

(75) Inventor: Jian-Hui Lu, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 434 days.

(21) Appl. No.: 12/151,828

(22) Filed: May 8, 2008

(65) Prior Publication Data

US 2008/0278980 A1 Nov. 13, 2008

(30) Foreign Application Priority Data

May 9, 2007 (CN) .......................... 2007 1 0074347

(51) Int. Cl.
*H02M 7/5387* (2007.01)

(52) U.S. Cl. ........................................... 363/71; 363/98

(58) Field of Classification Search ................... 363/17, 363/71, 98, 132
See application file for complete search history.

(56) References Cited

U.S. PATENT DOCUMENTS

| | | | | |
|---|---|---|---|---|
| 5,576,940 A | * | 11/1996 | Steigerwald et al. | 363/17 |
| 6,574,125 B2 | * | 6/2003 | Matsukawa et al. | 363/71 |
| 7,518,886 B1 | * | 4/2009 | Lai et al. | 363/17 |
| 2004/0130921 A1 | * | 7/2004 | Fukumoto | 363/98 |
| 2005/0007149 A1 | | 1/2005 | Svensson et al. | |
| 2005/0047176 A1 | | 3/2005 | Fukumoto | |
| 2006/0187690 A1 | * | 8/2006 | Fukumoto | 363/71 |
| 2007/0008751 A1 | | 1/2007 | Toda et al. | |
| 2007/0297205 A1 | * | 12/2007 | Chen et al. | 363/132 |
| 2008/0074578 A1 | * | 3/2008 | Kwon et al. | 349/61 |
| 2008/0278980 A1 | * | 11/2008 | Lu | 363/71 |

FOREIGN PATENT DOCUMENTS

CN 200520041664.9 Y 7/2006

* cited by examiner

*Primary Examiner* — Jeffrey L Sterrett
(74) *Attorney, Agent, or Firm* — Wei Te Chung

(57) ABSTRACT

An exemplary direct current to alternating current converter includes a pulse width modulator having a plurality of pulse signal outputs that can provide a plurality of pulse signals, a driving circuit having a plurality of switching units, and a transformation circuit having a plurality of transformers. Each of the switching units includes a P-type transistor and an N-type transistor. Each pulse signal output is electrically connected to the P-type and N-type transistors of one of the switching units. Each of the transformers is connected to two of the switching units, and the P-type transistors and the N-type transistors of the two switching units are not switched on simultaneously.

14 Claims, 5 Drawing Sheets

DC-AC CONVERTER WITH FAST RESPONSE SPEED

FIELD OF THE INVENTION

This invention relates to a direct current to alternating current (DC-AC) converter, and more particularly to a DC-AC converter used in a power module of a liquid crystal display (LCD) with fast response speed.

GENERAL BACKGROUND

The cold cathode fluorescent lamp (CCFL) has come into widespread use as a back light source for products such as a liquid crystal monitor of a notebook PC, a liquid crystal display, and so on. In general, the CCFL might be of higher efficiency and longer life use than those of an ordinary hot cathode fluorescent lamp. A filament usually provided in a hot cathode fluorescent lamp is omitted from the CCFL.

Start-up and activation of the CCFL require a high AC voltage. For instance, a start-up voltage of the CCFL is about 1,000 volts, and an operating voltage of the CCFL is about 600 volts. Such a high AC voltage is produced from a DC power source of a laptop computer or a liquid crystal display through use of a DC-AC converter, or an inverter.

Referring to FIG. 3, a typical DC-AC converter 10 includes a pulse width modulator (PWM) 110, a driving circuit 120, and a transformation circuit 130.

The PWM 110 includes a first pulse output 111, a second pulse output 112, a third pulse output 113, and a fourth pulse output 114, all of which can provide sequential pulse signals.

The driving circuit 120 includes a direct current input 125, a first switching unit 121, a second switching unit 122, a third switching unit 123, and a fourth switching unit 124. The first switching unit 121 includes a first P-type transistor 1211 and a first N-type transistor 1212. The second switching unit 122 includes a second P-type transistor 1221 and a second N-type transistor 1222. The third switching unit 123 includes a third P-type transistor 1231 and a third N-type transistor 1232. The fourth switching unit 124 includes a fourth P-type transistor 1241 and a fourth N-type transistor 1242.

The transformation circuit 130 includes a first transformer 131, a second transformer 132, a first capacitor 133, and a second capacitor 134. The first transformer 131 includes a first primary winding 1311 and a first secondary winding 1312. The second transformer 132 includes a second primary winding 1321 and a second secondary winding 1322.

The first pulse output 111 is connected to gates of the first and third P-type transistors 1211, 1231. The second pulse output 112 is connected to gates of the first and third N-type transistors 1212, 1232. The third pulse output 113 is connected to gates of the second and fourth P-type transistors 1221, 1241. The fourth pulse output 114 is connected to gates of the second and fourth N-type transistors 1222, 1242.

Sources of the first, second, third, and fourth P-type transistors 1211, 1221, 1231, and 1241 are connected to the direct current input 125. Sources of the first, second, third, and fourth N-type transistors 1212, 1222, 1232, and 1242 are connected to ground.

One end of the first primary winding 1311 is connected to drains of the first P-type transistor 1211 and the first N-type transistor 1212, the other end of the first primary winding 1311 is connected to drains of the second P-type transistor 1221 and the second N-type transistor 1222 via the first capacitor 133 respectively.

One end of the second primary winding 1321 is connected to drains of the third P-type transistor 1231 and the third N-type transistor 1232, the other end of the second primary winding 1321 is connected to drains of the fourth P-type transistor 1241 and the fourth N-type transistor 1242 via the second capacitor 134, respectively. The first to fourth P-type transistors 1211, 1221, 1231, and 1241 and the first to fourth N-type transistors 1212, 1222, 1232, and 1242 are metal oxide semiconductor field effect transistors (MOSFETs). The first to fourth P-type transistors 1211, 1221, 1231, and 1241 and the first to fourth N-type transistors 1212, 1222, 1232, and 1242 are in on-states when high-level voltages are applied to the gates thereof, and are in off-states when low-level voltages are applied to the gates thereof. The high-level voltage can be a power voltage, and the low-level voltage can be a ground voltage.

Referring to FIG. 4, this shows schematic time charts of pulse signals provided by the PWM 110. In FIG. 4, VNA1, VNB1, VNA2, and VNB2 represent the pulse signals applied by the first, the second, the third, and the fourth pulse outputs 111, 112, 113, and 114, respectively. The pulse signals VNA1, VNB1, VNA2, and VNB2 have a same duty ratio of 50% and a same cycle period. The pulse signals VNA1 and VNA2 have a same phase, and the pulse signals VNB1 and VNB2 have a same phase. However, the pulse signals VNA1 and VNB1 have different phases. The difference of the phase of the pulse signal VNA1 and the phase of the pulse signal VNB1 is greater than 0, and not more than half the cycle period.

Working procedure and principle of the DC-AC converter 10 are described as follows, and for the simplicity, only one cycle period (t1~t5) of the working procedure is described in detail.

During the period t1~t2, the pulse signals VNA1 and VNA2 are low-level voltages, and the pulse signals VNB1 and VNB2 are high-level voltages. Thus, the first P-type transistor 1211 and the second N-type transistor 1222 are in on-states, while the second P-type transistor 1221 and the first N-type transistor 1212 remain in off-states. A direct current applied by the direct current input 125 is grounded via the first P-type transistor 1211, the first primary winding 1311, the first capacitor 133, and the second N-type transistor 1222. As a result, the first capacitor is charged and the first primary winding 1311 generates and stores electromagnetism energy therein. The first primary winding 1311 has a working current flowing in a clockwise direction therein.

The third P-type transistor 1231 and the fourth N-type transistor 1242 are switched on, while the third N-type transistor 1232 and the fourth P-type transistor 1241 are in off-states. The direct current applied by the direct current input 125 is grounded via the first P-type transistor 1231, the second primary winding 1321, the second capacitor 134, and the fourth N-type transistor 1242. As a result, the second capacitor 134 is charged, and the second primary winding 1321 generates and stores electromagnetism energy. The second primary winding 1321 has a working current flowing in a clockwise direction therein.

During the period t2~t3, the pulse signals VNA1 and VNA2 jump to high-level voltages, and the pulse signals VNB1, VNB2 remain high-level voltages.

The first and second P-type transistors 1211, 1221 are in off-states, while the first and second N-type transistors 1212, 1222 are in on-states. The first N-type transistor 1212, the first primary winding 1311, the first capacitor 133, and the second N-type transistor 1222 cooperatively constitute a loop. The first primary winding 1311 releases the electromagnetism energy stored therein. The first capacitor 133 continues to be charged. The first working current flows clockwise in the first primary winding 1311. Moreover, the third and fourth P-type transistors 1231, 1241 are in off-states. The third and fourth N-type transistors 1232, 1242 are in on-states. The third N-type transistor 1232, the second primary winding 1321, the second capacitor 134, and the fourth N-type transistor 1242 cooperatively constitute a loop. The second primary winding 1321 releases the electromagnetism energy stored therein. The second capacitor 134 continues to be charged. The second primary winding 1321 has a working current flowing in the clockwise direction thereof.

During the period t3~t4, the pulse signals VNA1 and VNA2 are high-level voltages, and the pulse signals VNB1 and VNB2 are low-level voltages. The first P-type transistor 1211 is in an off-state. The first N-type transistor 1212 is in an on-state. The second P-type transistor 1221 is in an on-state. The second N-type transistor 1222 is in an off-state. The direct current applied by the direct current input 125 is grounded via the second P-type transistor 1212, the first capacitor 133, the first primary winding 1311, and the first N-type transistor 1212. The first capacitor 133 is reversely charged. The first primary winding 1311 stores electromagnetism energy. The first primary winding 1311 has a working current flowing in a counterclockwise direction thereof.

The third P-type transistor 1231 is in an off-state, and the third N-type transistor 1232 is in an on-state. The fourth P-type transistor 1241 is in an on-state, and the fourth N-type transistor 1242 is in an off-state. The direct current applied by the direct current input 125 is grounded via the fourth N-type transistor 1242, the second capacitor 134, the second primary winding 1321, and the second N-type transistor 1222. The second capacitor 134 is reversely charged by the direct current applied by the direct current input 125. The second primary winding 1321 stores electromagnetism energy. The second primary winding 1321 has a working current flowing in a counterclockwise direction thereof.

During the period t4~t5, the pulse signals VNA1, VNA2, VNB1, and VNB2 are all low-level voltages. The first and second P-type transistors 1311, 1221 are in on-states. The first and second N-type transistors 1212, 1222 are in off-states. The second P-type transistor 1221, the first capacitor 133, the first primary winding 1311, and the first P-type transistor 1211 constitute a loop. The first primary winding 1311 releases the electromagnetism stored therein. The first primary winding 1311 has a working current flowing in the counterclockwise direction thereof.

The third and fourth P-type transistors 1231, 1341 are in on-states, and the third and fourth N-type transistors 1232, 1242 are in off-states. The fourth P-type transistor 1241, the second capacitor 134, the second primary winding 1321, and the third P-type transistor 1231 constitute a loop. The second primary winding 1321 releases electromagnetism energy and the second capacitor 134 is changed. The second primary winding 1321 has a working current flowing in the counterclockwise direction thereof.

After the period t4 to t5, the DC-AC converter 10 works as repeating of the cycle t1 to t5. The first to fourth P-type transistors 1211~1241 and the first to fourth N-type transistors 1212 to 1242 are switched between on and off states due to the driving of the pulse signals VNA1, VNA2, VNB1, and VNB2. Thus, the working currents in the first and second primary windings 1331, 1332 are switched between flowing clockwise and flowing counterclockwise, thereby generating corresponding alternating currents thereof.

The first pulse output 111 is connected to the first and third P-type transistors 1211, 1231. That is, the first and third P-type transistors 1211, 1231 are switched to on-states simultaneously.

Generally, a gate and a source of a typical transistor constitute a parasitic capacitor. Referring to FIG. 5, the gate and the source of the first P-type transistor 1211 constitute a parasitic capacitor C1, and the gate and the source of the third P-type transistor 1231 constitute a parasitic capacitor C2. Because the first and third P-type transistors 1211, 1231 are switched to on-states simultaneously, a parallel capacitance of the parasitic capacitors C1, C2 is a sum of the capacitance of the parasitic C1 plus the capacitance of the parasitic capacitor C2. Thus, a speed of response relating to the first and third P-type transistors 1211, 1231 being switched on simultaneously is declined comparing to what relating to each single one of the first and third P-type transistor 1211, 1231 being switched on separately. Accordingly, the first and third N-type transistors 1212, 1232, the second and fourth P-type transistors 1221, 1241, and the second and fourth N-type transistors 1222, 1242 are slow in response speed of switching between the on and off states, respectively.

What is needed, therefore, is a DC-AC converter that can overcome the above-described deficiencies.

SUMMARY

An exemplary direct current to alternating current converter includes a pulse width modulator having a plurality of pulse signal outputs that can provide a plurality of pulse signals, a driving circuit having a plurality of switching units, and a transformation circuit having a plurality of transformers. Each of the switching units includes a P-type transistor and an N-type transistor. Each pulse signal output is electrically connected to the P-type and N-type transistors of one of the switching units. Each of the transformers is connected to two of the switching units, and the P-type transistors and the N-type transistors of the two switching units are not switched on simultaneously.

Other novel features and advantages will become more apparent from the following detailed description when taken in conjunction with the accompanying drawings.

DETAILED DESCRIPTION OF PREFERRED EMBODIMENTS

Figure 1:
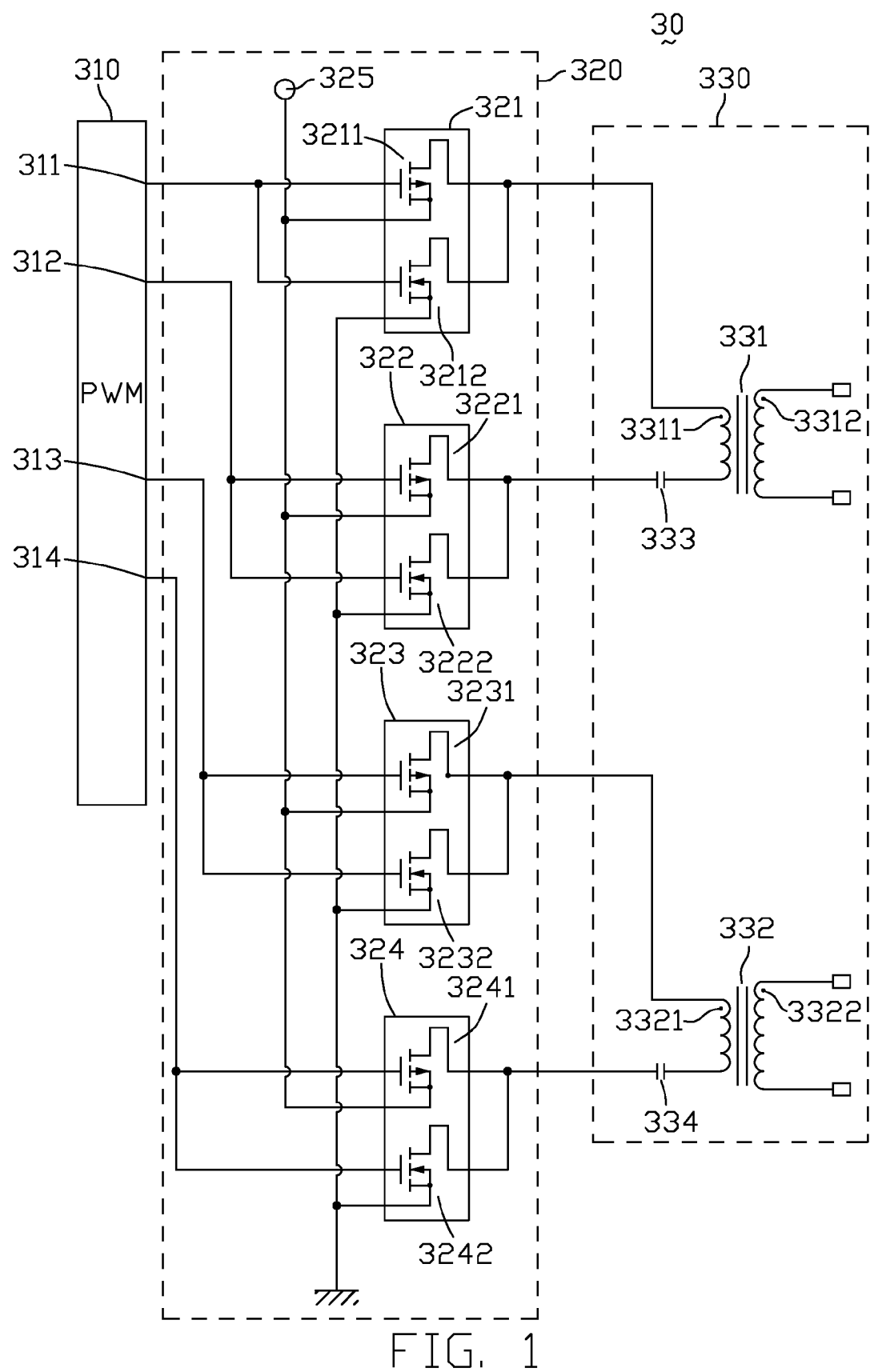
FIG. 1 is a circuit diagram of a DC-AC converter according to an exemplary embodiment of the present invention, the DC-AC converter including a PWM.

Referring to FIG. 1, a circuit diagram of a DC-AC converter 30 according to an exemplary embodiment is shown. The DC-AC converter 30 includes a PWM 310, a driving circuit 320, and a transformation circuit 330.

The PWM 310 includes a first pulse output 311, a second pulse output 312, a third pulse output 313, and a fourth pulse output 314.

The driving circuit includes a direct current input 325, a first switching unit 321, a second switching unit 322, a third switching unit 323, and a fourth switching unit 324. The first switching unit 321 includes a first P-type transistor 3211 and a first N-type transistor 3212. The second switching unit 322 includes a second P-type transistor 3221 and a second N-type transistor 3222. The third switching unit 323 includes a third P-type transistor 3231 and a third N-type transistor 3232. The fourth transistor unit 324 includes a fourth P-type transistor 3241 and a fourth N-type transistor 3242.

The transformation circuit 330 includes a first transformer 331, a second transformer 332, a first capacitor 333, and a second capacitor 334. The first transformer 331 includes a first primary winding 3311 and a first secondary winding 3312. The second transformer 332 includes a second primary winding 3321 and a second secondary winding 3322.

The first pulse output 311 is connected to gates of the first P-type transistor 3211 and the first N-type transistor 3212. The second pulse output is connected to gates of the second P-type transistor 3221 and the second N-type transistor 3222. The third pulse output 313 is connected to gates of the third P-type transistor 3231 and the third N-type of transistor 3232. The fourth pulse output 314 is connected to gates of the fourth P-type transistor 3241 and the fourth N-type transistor 3242.

Sources of the first, second, third, and fourth P-type transistors 3211, 3221, 3231, 3241 are connected to the direct current input 325. Sources of the first, second, third, and fourth N-type transistors 3212, 3222, 3232, 3242 are connected to ground.

One end of the first primary winding 3311 is connected to drains of the first P-type transistor 3211 and the first N-type transistor 3212, the other end of the first primary winding 3311 is connected to drains of the second P-type transistor 3221 and the second N-type transistor 3222 via the first capacitor 333. Two ends of the first secondary winding 3312 are connected to two ends of a load (not shown), for example a CCFL.

One end of the second primary winding 3321 is connected to drains of the third P-type transistor 3231 and the third N-type transistor 3232, the other end of the second primary winding 3312 is connected to drains of the fourth P-type transistor 3241 and the fourth N-type transistor 3242 via the second capacitor 334. Two ends of the second secondary winding 3322 are connected to two ends of a load.

The first to fourth P-type transistors 3211, 3221, 3231, and 3241 and the first to fourth N-type transistors 3212, 3222, 3232, and 3242 are MOSFETs. The first to fourth P-type transistors 3211, 3221, 3231, and 3241 and the first to fourth N-type transistors 3212, 3222, 3232, and 3242 are switched on when high-level voltages are applied to the gates thereof, and are switched off when low-level voltages are applied to the gates thereof. The high-level voltage can be a power voltage, and the low-level voltage can be a ground voltage.

Figure 2:
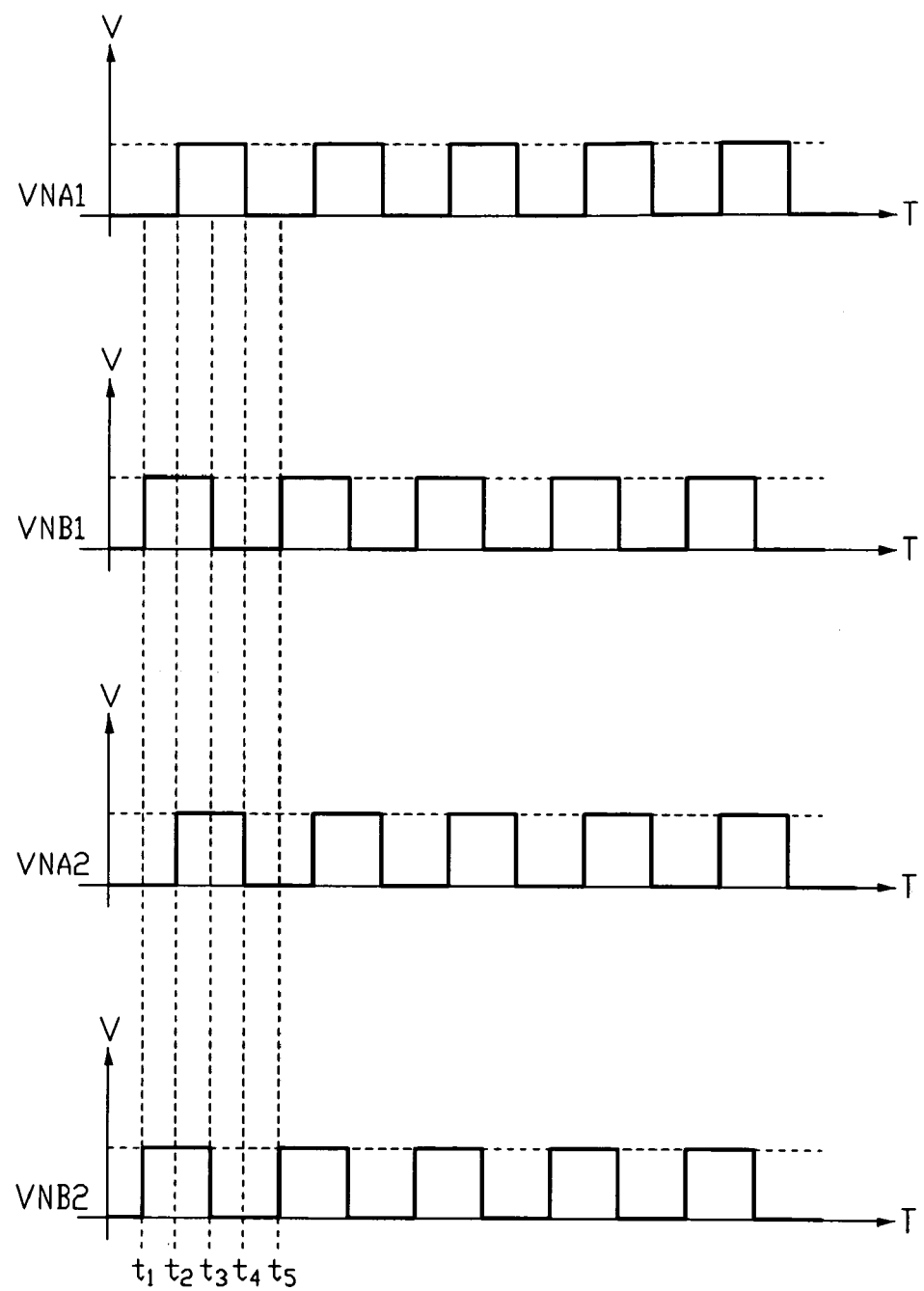
FIG. 2 is a schematic timing chart showing pulse signals applied by the PWM of FIG. 1.
Figure 3:
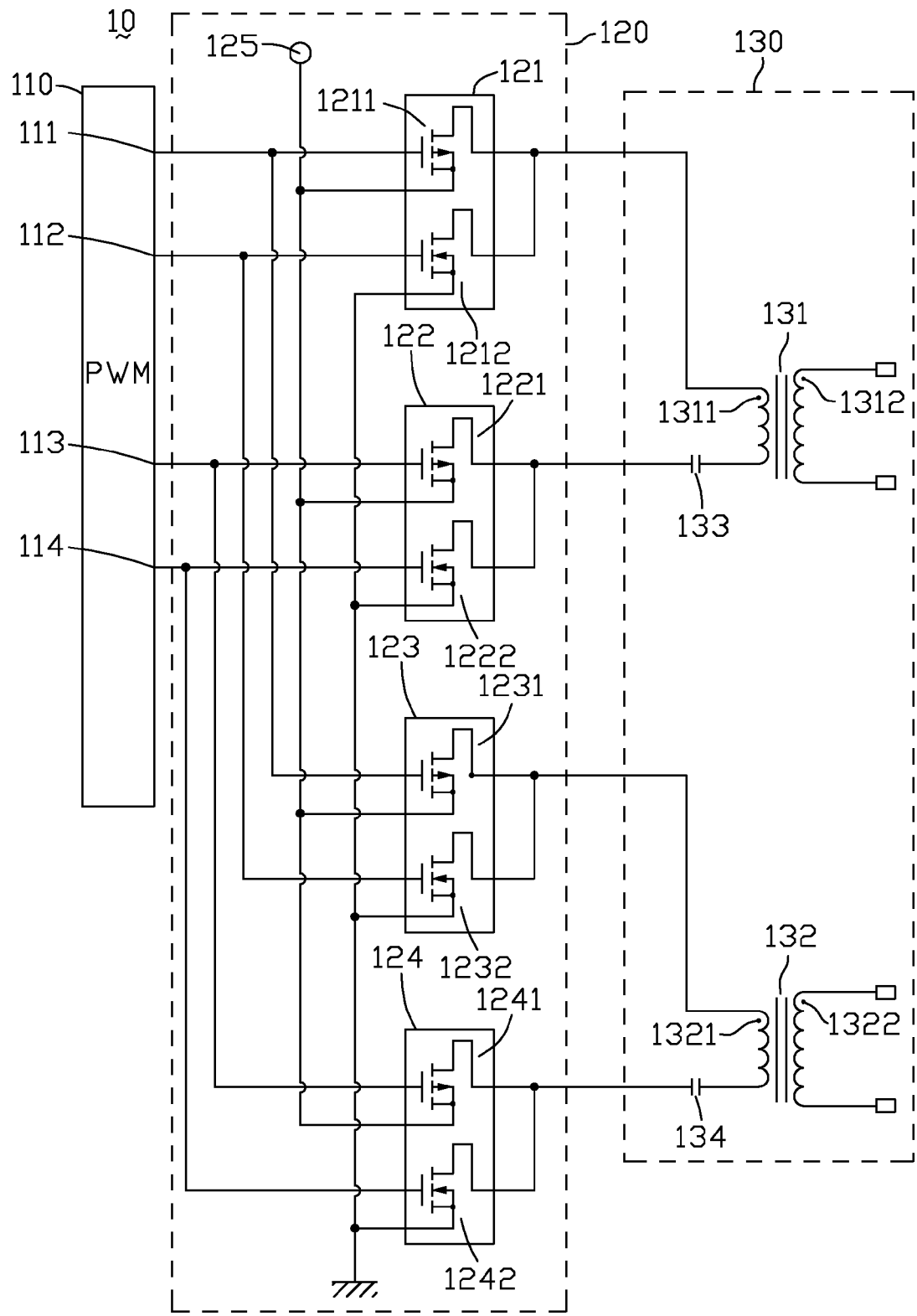
FIG. 3 is a circuit diagram of a conventional DC-AC converter, the DC-AC converter including a PWM and a driving circuit, the driving circuit including a first P-type transistor and a third P-type transistor.
Figure 4:
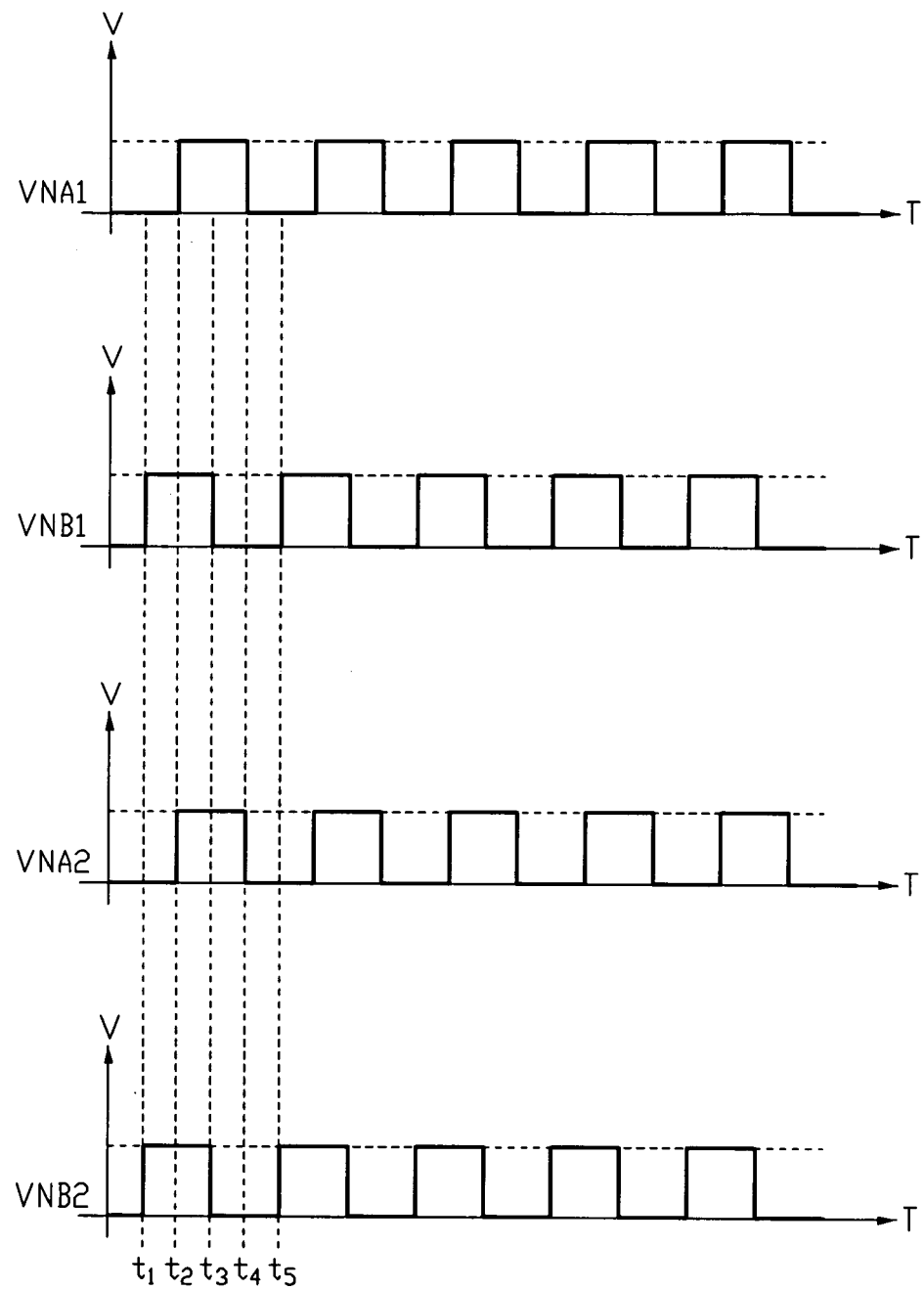
FIG. 4 is a schematic timing chart showing pulse signals applied by the PWM of FIG. 3.
Figure 5:
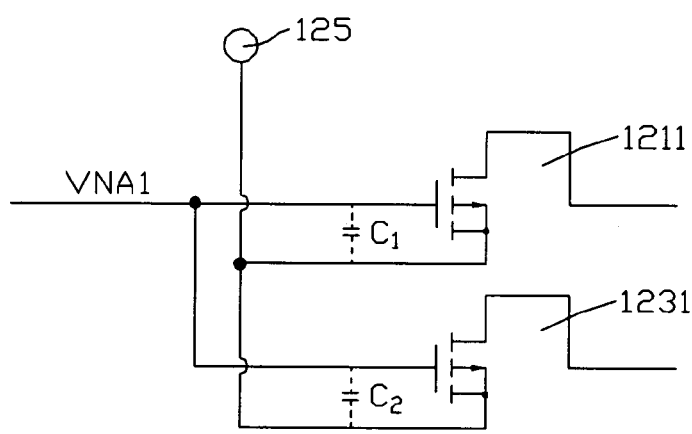
FIG. 5 is an abbreviated circuit diagram illustrating parasitic capacitors of the first and third P-type transistors of FIG. 3.

Referring also to FIG. 2, a schematic timing chart shows pulse signals applied by the PWM 310. Herein VNA1, VNB1, VNA2, and VNB2 are denoted for pulse signals respectively output from the first, the second, the third, and the fourth pulse outputs 311, 312, 313, 314. The pulse signals VNA1, VNB1, VNA2, and VNB2 have a same duty ratio of 50% and a same cycle period. The pulse signals VNA1 and VNA2 have a same phase, and the pulse signals VNB1 and VNB2 have a same phase. However, the pulse signals VNA1 and VNB1 have different phases. The difference of the phase of the pulse signal VNA1 and the phase of the pulse signal VNB1 is greater than 0, and no more than half the cycle period.

In the following paragraphs, the working principle of the DC-AC converter 30 is described, and a cycle period t1~t5 is considered by way of example only.

During the period t1~t2, the pulse signals VNA1 and VNA2 are at a low level, and the pulse signals VNB1 and VNB2 are at a high level. The first P-type transistor 3211 is switched on, and the first N-type transistor 3212 is switched off. The second P-type transistor 3221 is switched off, and the second N-type transistor 3222 is switched on. The direct current provided by the direct input 325 is grounded via the first P-type transistor 3211, the first primary winding 3311, the first capacitor 333, and the second N-type transistor 3222. The first capacitor 333 is charged by the direct current. The first primary winding 3311 generates and stores electromagnetism energy. The first primary winding 3311 has a working current flowing in a clockwise direction therein.

Similarly, the third P-type transistor 3231 is switched on, and the third N-type transistor 3232 is switched off. The fourth P-type transistor 3241 is switched off, and the fourth N-type transistor 3242 is switched on. The direct current provided by the direct current input 325 is grounded via the third P-type transistor 3231, the second primary winding 3321, the second capacitor 334, and the fourth N-type transistor 3242. The second capacitor 334 is charged, and the second primary winding 3321 generates and stores electromagnetism energy. The second primary winding 3321 has a working current flowing in a clockwise direction therein.

During the period t2~t3, the pulse signals VNA1 and VNA2 jump to a high level, and the pulse signal VNB1 and VNB2 remain high level. The first P-type transistor 3211 is switched off, and the first N-type transistor 3212 is switched on. The second P-type transistor 3221 remains in an off-state, and the second N-type transistor 3222 remains in an on-state. The first N-type transistor 3212, the first primary winding 3311, the first capacitor 333 and the second N-type transistor 3222 constitute an active loop. The second capacitor 334 is charged, and the second primary winding 3321 generates and stores electromagnetism energy. The second primary winding 3321 has a working current flowing in the clockwise direction thereof.

Similarly, the third P-type transistor 3231 is switched off, and the third N-type transistor 3232 is switched on. The fourth P-type transistor 3241 remains in an off-state, and the fourth N-type transistor 3242 remains in an on-state. The third N-type transistor 3232, the second primary winding 3321, the second capacitor 334, and the fourth N-type transistor 3242 constitute an active loop. The second primary winding 3321 releases the electromagnetism energy stored thereof and the second capacitor 334 is continuously charged.

During the period t3~t4, the pulse signals VNA1 and VNA2 remain at the high level, and the pulse signals VNB1 and VNB2 jump to a low level. The first P-type transistor 3211 remains in an off-state, and the first N-type transistor 3212 remains in an on-state. The second P-type transistor 3221 is switched on, and the second N-type transistor 3222 is switched off. The direct current provided by the direct current input 325 is grounded via the second P-type transistor 3212, the first capacitor 333, the first primary winding 3311, and the first N-type transistor 3212. The first capacitor 333 is reversely charged by the direct current output from the direct current input 325. The first primary winding 3311 continuously stores electromagnetism energy. The first primary winding 3311 has a working current flowing in a counter-clockwise direction therein.

Similarly, the third P-type transistor 3231 remains in an off-state, and the third N-type transistor 3232 remains in an on-state. The fourth P-type transistor 3241 is switched on, and the fourth N-type transistor 3242 is switched off. The direct current provided by the direct current input 325 is grounded via the fourth P-type transistor 3242, the second capacitor 334, the second primary winding 3321, and the second N-type transistor 3222. The second capacitor 334 is reversely charged by the direct current output from the direct current input 325. The second primary winding 3321 continuously stores electromagnetism energy. The second primary winding 3321 has a working current flowing in a counterclockwise direction therein.

During the period t4~t5, the pulse signals VNA1 and VNA2 jump to a low level, and the pulse signals VNB1 and VNB2 remain low-level. The first P-type transistor 3211 is switched on, and the first N-type transistor 3212 is switched off. The second P-type transistor 3221 remains in an on-state, and the second N-type transistor 3222 remains in an off-state. The second P-type transistor 3221, the first capacitor 333, the first primary winding 3311, and the first P-type transistor 3311 constitute an active loop. The first primary winding 3311 releases the electromagnetism energy and the first capacitor 333 is charged. The first primary winding 3311 has a working current flowing in the counterclockwise direction therein.

The third P-type transistor 3231 is switched on, and the third N-type transistor 3232 is switched off. The fourth P-type transistor 3241 remains in an on-state, and the fourth N-type transistor 3242 remains in an off-state. The fourth P-type transistor 3241, the second capacitor 334, the second primary winding 3321, and the third P-type transistor 3331 constitute an active loop. The second primary 3321 releases the electromagnetism stored therein and the second capacitor 334 is charged. The second primary winding 3321 has a working current flowing in the counterclockwise direction therein.

During the cycle period t1~t5, the first and second primary windings 3311, 3321 both have the current flowing therein switched between clockwise and counterclockwise due to the driving of the pulse signals VNA1, VNA2, VNB1, and VNB2. The first and second secondary windings 3312, 3322 correspondingly generate alternating currents therein. Thus, the DC-AC converter 30 converts the direct current into alternating current. After the period t4~t5, the DC-AC converter 10 repeats the working procedure of the cycle period t1~t5.

The DC-AC converter 30 has each one of the pulse signals VNA1, VNA2, VNB1, and VNB2 to control on and off states of a unit of one P-type transistor and one N-type transistor, and at any given moment the P-type and N-type transistors are not switched on simultaneously. Thus, a response speed of the P-type and N-type transistors is fast. In alternative and further embodiments, the PWM 31 may include only two, four, or more pulse signal outputs.

It is to be further understood that even though numerous characteristics and advantages of the present embodiments have been set out in the foregoing description, together with details of the structures and functions of the embodiments, the disclosure is illustrative only, and that changes may be made in detail, especially in matters of shape, size, and arrangement of parts within the principles of the invention to the full extent indicated by the broad general meaning of the terms in which the appended claims are expressed.

What is claimed is:

1. A direct current to alternating current (DC-AC) converter comprising:
   a pulse width modulator (PWM) comprising a plurality of pulse signal outputs capable of providing a plurality of pulse signals;
   a driving circuit comprising a plurality of switching units, each of the switching units comprising a P-type transistor and an N-type transistor, each pulse signal output being electrically connected to the P-type and N-type transistors of a corresponding one of the switching units; and
   a transformation circuit comprising a plurality of transformers, each of the transformers being connected to two of the switching units, wherein the P-type transistors and the N-type transistors of the two switching units are configured to not be switched on simultaneously.

2. The DC-AC converter of claim 1, wherein the driving circuit further comprises a direct current input electrically connected to the P-type transistors, the direct current input being capable of providing a direct current to the switching units.

3. The DC-AC converter of claim 2, wherein for each switching unit, each of the P-type and N-type transistors comprises a gate, a source and a drain, the gates of the P-type transistor and the N-type transistor being connected to the pulse signal output, the drains of the P-type transistor and the N-type transistor being connected to the transformer, the source of the P-type transistor being connected to the direct current input, and the source of the N-type transistor being connected to ground.

4. The DC-AC converter of claim 3, wherein each transformer comprises a primary winding and a secondary winding, one end of the primary winding being connected to the drains of the P-type and N-type transistors of one switching unit, and the other end of the primary winding being connected to drains of the P-type and N-type transistors of another switching unit, and the secondary winding being connected with an external load.

5. The DC-AC converter of claim 3, wherein the transformation circuit further comprises a plurality of capacitors, each transformer comprising a primary winding and a secondary winding, one end of the primary winding being connected to the drains of the P-type and N-type transistors of one switching unit, and the other end of the primary winding being connected to drains of the P-type and N-type transistors of another switching unit via one capacitor, and the secondary winding being connected with an external load.

6. The DC-AC converter of claim 1, wherein the PWM comprises four pulse signal outputs, the driving circuit comprising four switching units, and the transformation circuit comprising two transformers.

7. The DC-AC converter of claim 1, wherein the pulse signals provided by the pulse signal outputs have two different phases.

8. A direct current to alternating current (DC-AC) converter comprising:
   a pulse width modulator (PWM) comprising a plurality of pulse signal outputs configured for providing a plurality of pulse signals in different phases;
   a driving circuit comprising a plurality of switching units corresponding to the pulse signal outputs, each switching unit comprising a P-type transistor and an N-type transistor; and
   a transformation circuit comprising a plurality of transformers, each transformer being electrically connected to two of the switching units, wherein said two of the switching units are capable of having two of the pulse signals in different phases applied thereto.

9. The DC-AC converter of claim 8, wherein the driving circuit further comprises a direct current input electrically connected to the P-type transistors, the direct current input being capable of providing a direct current to the switching units.

10. The DC-AC converter of claim 9, wherein for each switching unit, each of the P-type and N-type transistors comprises a gate, a source and a drain, the gates of the P-type transistor and the N-type transistor being connected to the pulse signal output, the drains of the P-type transistor and the N-type transistor being connected to the transformer, the source of the P-type transistor being connected to the direct current input, and the source of the N-type transistor being connected to ground.

11. The DC-AC converter of claim 10, wherein each transformer comprises a primary winding and a secondary winding, one end of the primary winding being connected to the drains of the P-type and N-type transistors of one switching unit, and the other end of the primary winding being connected to drains of the P-type and N-type transistors of another switching unit, and the secondary winding being connected with an external load.

12. The DC-AC converter of claim 10, wherein the transformation circuit further comprises a plurality of capacitors, each transformer comprising a primary winding and a secondary winding, one end of the primary winding being connected to the drains of the P-type and N-type transistors of one switching unit, and the other end of the primary winding being connected to drains of the P-type and N-type transistors of another switching unit via one capacitor, and the secondary winding being connected with an external load.

13. The DC-AC converter of claim 8, wherein the pulse signals provided by the pulse signal outputs having two different phases.

14. The DC-AC converter of claim 8, wherein the P-type transistors and the N-type transistors of the two switching units are capable of not being switched on simultaneously.

* * * * *